US011124297B2

(12) United States Patent
Sohmshetty et al.

(10) Patent No.: US 11,124,297 B2
(45) Date of Patent: Sep. 21, 2021

(54) PORTABLE AND VEHICLE-INTEGRATED STORAGE AND DEPLOYMENT SYSTEM FOR UNMANNED AERIAL VEHICLE

(71) Applicant: Ford Global Technologies, LLC, Dearborn, MI (US)

(72) Inventors: Raj Sohmshetty, Canton, MI (US); Rick H. Wykoff, Commerce Township, MI (US); Michael Musa Azzouz, Dearborn Heights, MI (US); Kevin VanNieulande, Fraser, MI (US); Jeremy John Malick, Menlo Park, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 16/138,772

(22) Filed: Sep. 21, 2018

(65) Prior Publication Data
US 2020/0094957 A1   Mar. 26, 2020

(51) Int. Cl.
*B64C 39/02* (2006.01)
*B64F 1/00* (2006.01)
*B60P 3/11* (2006.01)

(52) U.S. Cl.
CPC .............. *B64C 39/024* (2013.01); *B60P 3/11* (2013.01); *B64F 1/007* (2013.01); *B64C 2201/208* (2013.01)

(58) Field of Classification Search
CPC ...... B60P 3/11; B64F 1/002; B64C 2201/201; B64C 2201/203; B64C 2201/208
See application file for complete search history.

(56) References Cited

U.S. PATENT DOCUMENTS 9,056,676 B1 *  6/2015  Wang ........................ B60R 9/00
9,561,871 B2   2/2017  Sugumaran
(Continued)

FOREIGN PATENT DOCUMENTS

WO   2017/157863 A1   9/2017

OTHER PUBLICATIONS

Phillip, Sam, "This Renault concept has a roof-mounted drone," Published Feb. 6, 2014. https://www.topgear.com/car-news/concept/renault-concept-has-roof-mounted-drone.
(Continued)

*Primary Examiner* — Richard G Davis
(74) *Attorney, Agent, or Firm* — Brandon Hicks; Eversheds Sutherland (US) LLP

(57) ABSTRACT

A portable case for an unmanned aerial vehicle (UAV) and a system including a portable case for UAV and an adapter for coupling the portable case to a vehicle are disclosed. An example system may include an exterior attachment disposed on an exterior of a vehicle, an adapter configured to couple a portable case for an UAV to the exterior attachment, and a moveable cover connected to the vehicle and configured to cover the portable case when the portable case is coupled to the vehicle. An example portable case may comprise a landing pad for the UAV, a bottom portion having the landing pad and configured to connect to the exterior attachment via the adapter, and a removable upper portion configured to be connected to the bottom portion when the bottom portion is disconnected from the at least one exterior attachment.

17 Claims, 8 Drawing Sheets

(56) References Cited

U.S. PATENT DOCUMENTS

| | | |
|---|---|---|
| 2016/0009413 A1 | 1/2016 | Lee et al. |
| 2017/0225801 A1* | 8/2017 | Bennett .................. B64F 1/005 |
| 2019/0106224 A1* | 4/2019 | Nishikawa ............. B64D 47/08 |
| 2019/0308724 A1* | 10/2019 | Cooper .................. B64F 1/222 |

OTHER PUBLICATIONS

UAV Factory. Unmanned Platforms and Subsystems. http://www.uavfactory.com/product/47.

* cited by examiner

PORTABLE AND VEHICLE-INTEGRATED STORAGE AND DEPLOYMENT SYSTEM FOR UNMANNED AERIAL VEHICLE

TECHNICAL FIELD

The present disclosure relates to a portable case for an unmanned aerial vehicle (UAV) and a system including a portable case for the UAV and an adapter for coupling the portable case to a vehicle.

BACKGROUND

A typical UAV, which is also commonly known as a "drone," is an unmanned aircraft which can be remotely controlled by an operator. UAVs are routinely used for search and rescue, video surveillance, security monitoring, filming, to name a few. The storage, transportation, and charging of UAVs can be challenging, especially when there is a need to transport UAVs by a land vehicle. Efforts have been made to equip land vehicles with storage compartments for UAVs. But these storage compartments are found to be ineffective, inconvenient to use, or incompatible with different types of vehicles.

BRIEF DESCRIPTION OF THE DRAWINGS

Embodiments are illustrated by way of example and not limitation in the figures of the accompanying drawings, in which like references indicate similar components and in which.

DETAILED DESCRIPTION

Figure 1:
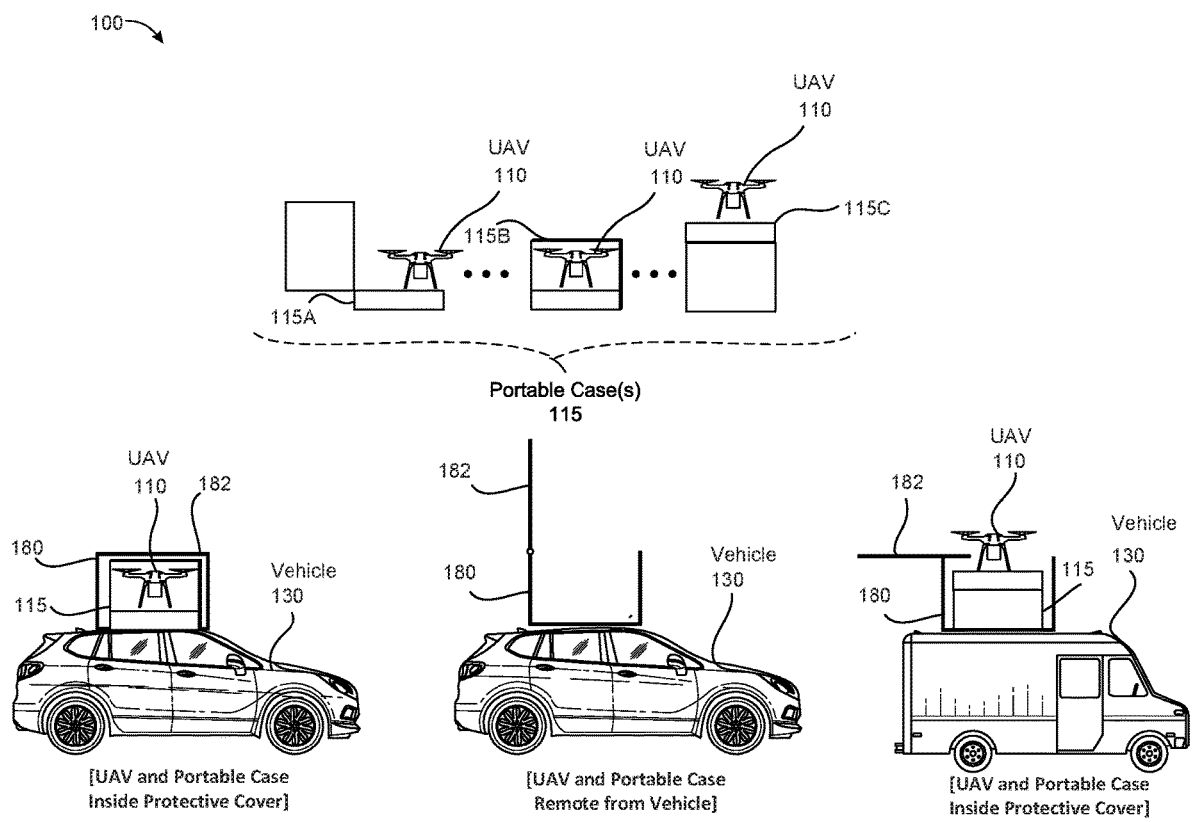
FIG. 1 is a schematic illustration of an example implementation of a portable case for storing and deploying an UAV, and a system securing the portable case to a vehicle in accordance with one or more embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Unmanned aerial vehicles (UAVs) such as drones may be used in search and rescue operations, policing operations, facilities monitoring, delivery services, and other applications. As UAV capabilities improve and regulations become more friendly to commercial use of UAVs, the use of drones is likely to grow.

One growing area of UAV application includes UAV integration with vehicles. For example, delivery vehicles may included integrated UAV systems specific to the type of vehicle. However, the wide variety of vehicle configurations, shapes, sizes, and features may limit integration of a UAV deployment system. For example, some vehicles may have different size landing pads based on the size of the vehicle's roof. Other vehicles may include deployment systems allowing UAVs to be stored inside of a vehicle. The types of UAV docking and landing systems which facilitate storage and deployment may be vehicle-dependent, making UAV vehicle integration less useful than if the a UAV deployment system were able to adapt to different vehicle configurations.

Another growing area of UAV application includes portable UAV deployment systems. Some portable UAV systems may allow for deployment of a launching/landing pad in multiple locations without requiring attachment to or integration with other devices, vehicles, or systems. Portability of UAV deployment systems may allow for drone deployment in areas vehicles cannot access, for example, and may make UAV deployment systems more desirable than limiting such deployment systems to a vehicle.

To capture both the benefits of UAV vehicle integration and portable UAV deployment, it may be desirable to have a portable UAV deployment system which is adaptable for integration with different types of vehicle configurations.

Example embodiments of the present disclosure relate to devices, systems, and methods for portable and adaptable UAV deployment.

Embodiments of this disclosure also concern a system including the portable case for UAV and an adapter for coupling the portable case to a vehicle. An example system may include an exterior attachment disposed on an exterior of a vehicle, an adapter which may couple a portable case for UAV to the exterior attachment, and a moveable cover connected to the vehicle and able to cover the portable case when the portable case is coupled to the vehicle.

An example portable case may include a landing pad for the UAV, a bottom portion having the landing pad and able to connect to the exterior attachment via the adapter, and a removable upper portion able to be connected to the bottom portion when the bottom portion is disconnected from the at least one exterior attachment. The landing pad and the UAV may be disposed between the removable upper portion and the bottom portion when the removable upper portion is connected to the bottom portion.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Aspects of the embodiments will now be presented with reference to a portable case for UAV and a system for a portable case for UAV and an adapter thereof. For purposes of this patent document, the terms "or" and "and" may mean "and/or" unless stated otherwise or clearly intended otherwise by the context of their use. The term "a" may mean "one or more" unless stated otherwise or where the use of "one or more" is clearly inappropriate. The terms "comprise," "comprising," "include," and "including" are interchangeable and not intended to be limiting. For example, the term "including" can be interpreted to mean "including, but not limited to."

Moreover, it should be understood that when an component is referred to as being "on" or "connected" or "coupled" to another component, it can be directly on or connected or coupled to the other component or intervening components can be present. In contrast, when an component is referred to as being "directly on" or "directly connected" or "directly coupled" to another component, there are no intervening components present. Other words used to describe the relationship between components should be interpreted in a like fashion (e.g., "between" versus "directly between," "adjacent" versus "directly adjacent," and so forth). Spatially relative terms, such as "beneath," "below," "lower," "above," "upper" and the like may be used to describe an component or feature's relationship to another component(s) and/or feature(s) as, for example, illustrated in the drawings. It should be appreciated the spatially relative terms are intended to encompass different orientations of the system for the portable case for UAV or its components in use in addition to the orientation depicted in the figures. For example, if the system or any of its components in the drawings is turned over, components described as "below" and/or "beneath" other components or features would then be oriented "above" the other components or features. The system for the portable case or its components may be otherwise oriented (e.g., rotated 90 degrees or at other orientations) and the spatially relative descriptors used herein interpreted accordingly.

The term "vehicle" of this disclosure can refer to any land (terrain) device, system or apparatus for transporting, carrying or conveying individuals or objects, including, without limitation, automobiles, buses, trucks, vans, sport utility vehicles (SUVs), trailers, recreational vehicles, trains, railroad cars, boats, ships, farm equipment, mobile homes, trailers, electric cars, motorcycles, motorbikes, bikes, bicycles, and so forth.

The term "UAV" can refer to an unmanned aerial vehicle, "drone," or an aircraft without a human pilot aboard. In some embodiments, the UAV may include autonomous UAV. The operation of UAV can be controlled remotely by a user using a computing device, including, without limitation, a smart phone, cellular phone, laptop computer, tablet computer, desktop computer, in-vehicle computer, and remote controller. As such, a user can use a computing device to remotely cause the UAV to lift off (e.g., deploy from) a launching pad, fly in various directions, land on the launching pad or another location, take photos or capture video, wirelessly transmit data, and the like.

Example embodiments are described with reference to the drawings. The drawings are schematic illustrations of idealized example embodiments. As such, variations from the shapes of the illustrations as a result, for example, of manufacturing techniques or tolerances, are to be expected. Thus, example embodiments discussed herein should not be construed as limited to the particular shapes of regions illustrated herein but are to include deviations in shapes that result, for example, from manufacturing.

FIG. 1 is a schematic illustration of an example implementation 100 of a portable case for storing and deploying an UAV, and a system enabling securing the portable case to a vehicle in accordance with one or more embodiments of the disclosure.

Referring to FIG. 1, a UAV 110 may be stored and transported in a portable case 115. The portable case 115 may operatively connect to any type of vehicle (e.g., vehicle 130). The vehicle 130 may include a protective cover 180 for the UAV 110 and the portable case 115. The protective cover 180 may include a removable portion 182 (e.g., a retractable roof) which may open to allow the UAV 110 to take off from and land on a roof of the vehicle 130.

UAVs (e.g., UAV 110) can be used in commercial and recreational aerial photography, videography, and video surveillance. These devices often include complex and expensive equipment and require proper storage. The proper storage can be especially important when UAVs are needed to be transported to various locations for frequent deployment. Embodiments of the disclosure include a portable case 115 for one or more UAVs (e.g., UAV 11) and a system for one or more portable cases. A portable case 115 can include transformable housing for storing UAVs, when the UAVs are not in use. The portable case 115 can be secured to a vehicle (e.g., vehicle 130) or used as a carry-on storage for one or more UAVs.

Furthermore, the portable case 115 may include a launching pad (e.g., as shown in FIG. 3) for the UAVs and may optionally include electronics to facilitate charging of the UAVs, data transfer, and remote control of the UAVs. The system for the portable case may ensure that the portable case 115 may be removably coupled to the vehicle 130 (e.g., to a roof of the vehicle 115). Specifically, the system may provide for coupling the portable case 115 to the vehicle 130 either in an open position of the portable case 115 or in a closed position, and for decoupling the portable case 115 from the vehicle 130. The portable case 115 may be coupled to the vehicle 130, decoupled from the vehicle 130, and coupled to any other vehicle. The system may also facilitate electrical (e.g., wired or wireless) connection between the UAV 110 and the vehicle 130 or related user-equipment such as a remote UAV's controller, computing device, or electrical power charger.

FIG. 1 illustrates an implementation of the UAV 110 and the portable case 115, which can be also used as a launching pad for the UAV 110 both when the portable case 115 is coupled to the vehicle 130 and when the portable case 115 is decoupled and remote from the vehicle 130. Because the portable case 115 is transformable, it can be in an open position, a closed position, or a transformed position. In the closed position, the UAV 110 can be securely stored as shown in 115B. In an open position, as shown in 115A, a top portion of the portable case 115 is pivoted to expose the UAV 110 so as to enable a user to reach the UAV 110 or to cause the UAV 110 to be deployed from the bottom portion. In the transformed position, as shown in 115C, the top portion of the portable case 115 is removed and positioned underneath the bottom portion. In this position, the UAV 110 is ready to be deployed or retrieved by the user.

As further illustrated in FIG. 1, the portable case 115 can be directly or indirectly connected to a roof of a vehicle 130 (e.g., by attaching directly to a roof rack or to an adapter which may connect the portable case 115 to a roof rack). In other embodiments, the portable case 115 can be connected a trunk or any other part of the vehicle 130. As discussed above, the vehicle 130 can be of any suitable type, including, for example, a hatchback vehicle, sedan, sport utility vehicle, bus, commercial truck, or the like. As such, when the portable case 115 is connected to the vehicle 130, the portable case 115 can be used for storing and transporting the UAV 110, and as a launching pad for the UAV 110.

The vehicle 130 can be equipped with a roof fixture or railings for the ease of connecting the portable case 115 to the vehicle 130. Furthermore, there can be provided a movable portion 182 for covering the UAV 110 or the portable case 115 coupled to the vehicle 130 and containing the UAV 110. In certain embodiments, the movable portion 182 may be integrated into the roof of the vehicle 130 when deployed to cover the portable case 115. In other embodiments, the protective cover 180 may be part of or connected to the portable case 115. As shown in FIG. 1, the movable portion 182 can be opened, for example, by pivoting or sliding. In addition, it is important to note that the movable portion 182 can be of any suitable shape and design including, for example, a flat panel or a semi-dome structure.

In additional embodiments, there can be also provided an exterior attachment such as a roof rack which can be disposed on or connected to an exterior of the vehicle 130. Also, the movable portion 182 can be an integral part of or directly connected to an exterior attachment of the roof. Some examples of the exterior attachment may include railings, a housing, or a framed structure to secure the portable case 115 or the UAV 110.

Figure 2:
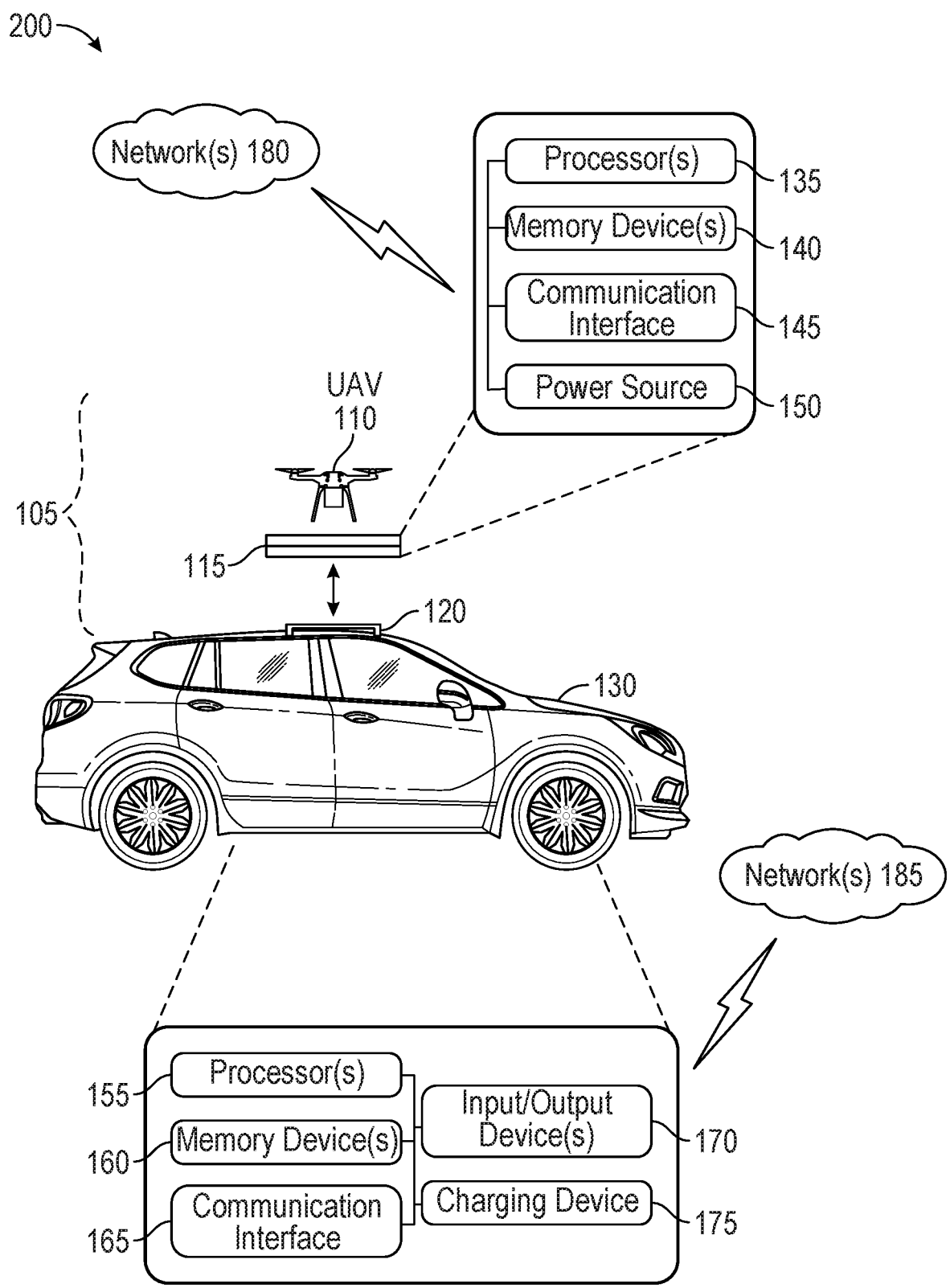
FIG. 2 is a schematic illustration of an example system architecture of a vehicle and a system for connecting a portable case for storage to and deployment of an UAV from the vehicle in accordance with one or more embodiments of the disclosure.

FIG. 2 is a schematic illustration of an example system architecture 200 of the vehicle 130 and a system for connecting the portable case 115 for storing and deploying the UAV 110 to the vehicle 130 in accordance with one or more embodiments of the disclosure. As shown in the figure, there is provided a UAV storage and deployment system 105 (referred herein to as the "system" or "system 105" for simplicity) for one or more UAVs (e.g., UAV 110). An example system 105 includes the portable case 115 for storing the UAV 110.

The system 105 may also optionally include the one or more protective covers 180 shown in FIG. 1. Each protective cover 180 can be connected to the vehicle 130, portable case 115, an adapter as described further below. The protective cover 180 can include a mechanical or an electromechanical device configured to cover the UAV 110 and the portable case 115 when the portable case 115 is coupled to the vehicle 130. The protective cover 180 can be locally or remotely controlled by a user such that the protective cover 180 can be opened to cause the UAV 110 to be deployed or to enable the user to retrieve the UAV 110 from the portable case 115. The user can also cause the removable portion 182 of the protective cover 180 close so as to securely enclose the UAV 110 for storing or transporting.

The portable case 115 may be coupled/attached to the vehicle 130 using an adapter 120. The adapter 120 can include a frame and one or more adjustors. The adjustors can include extenders, pushers, distance bars, bails, lateral struts, crossbars, stretchers, rods, and other similar components. The adapter is discussed further below.

Still referring to FIG. 2, the portable case 115 may include various electronics or computing components. According to one example embodiment, the portable case 115 includes one or more computer processors 135, one or more memory devices 140, one or more communication interfaces 145, and one or more power sources 150. These components of the portable case 115 can be operatively connected to each another.

The memory device(s) 140 can store software, firmware, or middleware (collectively referred herein to as "software" for simplicity) storing processor-executable instructions for implementing one or more functionalities as described herein. The term "software" can be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The memory device(s) 140 can include one or more computer-readable media. By way of example and not limitation, the computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store processor-executable code in the form of instructions or data structures that can be accessed by a computer. The computer-readable media can be configured to store the operational software and data of the portable case 115. The operational software may include processor-executable codes enabling the operation of the portable case 115 as described throughout this description (e.g., including data transfer functionality, charging functionality, remote control functionality, etc.). The operational data can include control commands, history logs, photos, videos, audio, and related information.

The computer processor(s) 135 are, in some examples, configured to implement the functionalities as described herein or process instructions for execution by the portable case 115. For example, the computer processor(s) 135 can process instructions stored in the memory device(s) 140. Such instructions may include components of an operating system and software application(s). Some examples of the computer processor(s) 135 include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. For example, the computer processor(s) 135 can be configured to implement data transfer between the vehicle 130 (or a user UAV's controlling device) and one or more UAVs 110. The computer processor(s) 135 can be also configured to control or monitor charging the UAVs 110. In yet additional embodiments, the computer processor(s) 135 can be configured to control or monitor operation (e.g., flying) of the UAVs 110.

The communication interface(s) 145 of the portable case 115 can be configured to exchange data with the vehicle 130, a user UAV's controlling device, the UAV 110, and a computer server directly or indirectly via one or more networks. The networks can include one or more wired, wireless, or optical networks such as the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The communication interface(s) 145 may be a radio frequency transceiver, a serial port, or any other type of device that can send and receive information. Other examples of such network interfaces may include Bluetooth®, 3G, 4G, LTE, and Wi-Fi® radios or modems. The communication interface(s) 145 may include one or more transceivers and antennas configured to transmit and receive wireless signals.

The communication interface 145 may allow the portable case 115 to receive wired or wireless communications from the vehicle (e.g., from communication interface 165) to control the portable case 115 and/or the UAV 110. For example, the one or more processors 135 may identify one or more signals received from the vehicle using the communication interface 145, and determine that the signals include instructions to open/close the portable case 115 and to launch the UAV 110. If the one or more processors 135 receive signals indicating that that UAV 110 is to be launched, the portable case 115 may unfasten or unlock the UAV 110 from the portable case 115 and may send one or more signals to the UAV 110 indicating commands which may cause the UAV 110 to lift off (e.g., deploy from) the portable case 115.

The power source(s) 150 may include one or more chargeable or replaceable electric batteries or accumulators. The power source(s) 150 can be used not only to power the electronic components of the portable case 155, but also to charge the UAV 110. The power source(s) 150 can also include electronics for charging the UAV 110. As such, the power source(s) 150 may be charged from the vehicle 130 or any other suitable external power source such as a charging station or an electric plug.

Still referring to FIG. 2, the vehicle 130 also may include a computing equipment configured to exchange data with the portable case 115 and/or the UAV 110. For example, when the portable case 115 is connected to the vehicle 130, the computing equipment of the vehicle 130 may receive data from the portable case 115 for further processing or transferring to a web service, a server, or a "cloud." The computing equipment of the vehicle 130 can be also used to remotely control the operation of the UAV 110, including lifting it off, flying in various directions, landing, making photos, recording a video, to name a few.

The computing equipment (e.g., a "in-vehicle computer") of the vehicle 130 may include one or more computer processors 155, one or more memory devices 160, one or more communication interfaces 165, one or more input/output devices 170, and one or more charging devices 175. In certain embodiments, the computing equipment of the vehicle 130 can generate one or more input signals to cause deployment and control over of the UAV 110, control over the portable case 115, and control over the protective cover 180 and the removable portion 182 of FIG. 1. The input signals can be transmitted from the vehicle 130 to the UAV 110 or the portable case 115. The input signals can be generated automatically or in a response to a user's input or command.

The computer processor(s) 155 can be configured to process processor-readable instructions. For example, the computer processor(s) 155 may process the instructions stored in the memory device(s) 160. In some embodiments, the instructions executed by the computer processor(s) 155 can include components of an operating system or software application(s) configured to provide one or more functionalities described throughout this disclosure. By way of an example, not a limitation, the functionalities can include charging the portable case 115, charging the UAV 110, exchanging data with the portable case 115, exchanging data with the UAV 110, exchanging data with any computing device (e.g., a user's computing device or smart phone) concerning the operation of the portable case 115 or the UAV 110. Furthermore, the functionalities can enable the user to control the operation of the UAV 110 from the vehicle. Examples of the computer processor(s) 155 include microprocessors, microcontrollers, CPUs, DSPs, FPGAs, PLDs, state machines, gated logic, discrete hardware circuits, and other suitable hardware configured to perform various functions described throughout this disclosure.

The memory device(s) 160 can store software such as processor-executable instructions for implementing one or more functionalities as described herein. Each of the memory device(s) 160 can include one or more computer-readable media. For example, the computer-readable media can include one or more of the following: a RAM, a ROM, an EEPROM, a CD-ROM, an optical disk storage, a magnetic disk storage, a solid state memory, or any other data storage devices, combinations of the aforementioned types of computer-readable media, or any other medium that can be used to store processor-executable code in the form of instructions or data structures that can be accessed by a computer. The computer-readable media can be configured to store the operational software (e.g., applications) and data of the vehicle 130. The operational software may relate to computer program code enabling the electronic operation of the vehicle 130 or the portable case 115 (e.g., including data transfer functionality, charging functionality, and remote control functionality).

The communication interface(s) 165 can be configured to exchange data between the vehicle 130 and one or more of the following: the portable case 115, the user UAV's controlling device, the UAV 110, or a computer server directly or indirectly via one or more networks. The networks can include one or more wired, wireless, or optical networks such as the Internet, intranet, LAN, WAN, cellular phone networks (e.g. GSM, LTE, etc.), Bluetooth radio, and an IEEE 802.11-based radio frequency network, among others. The communication interface(s) 165 may be a radio frequency transceiver, a serial port, or any other type of device that can send and receive information. Other examples of such network interfaces may include Bluetooth®, 3G, 4G, LTE, and Wi-Fi® radios or modems.

The input/output device(s) 170 can include one or more input devices configured to receive inputs from a user through tactile, audio, video, or biometric channels. Examples of the input devices may include a keyboard, keypad, mouse, trackball, touchscreen, touchpad, microphone, video camera, image sensor, fingerprint sensor, or any other device capable of detecting an input from a user or other source and relaying the input to the computer processor(s) 155. Additional examples of the input devices can include depth sensors, lidars, remote sensors, and so forth.

The input/output device(s) 170 can include one or more output devices configured to provide outputs to the user through visual or auditory channels. Examples of the output devices include a video graphics adapter card, a liquid crystal display (LCD) monitor, a light emitting diode (LED)

monitor, an organic LED monitor, a touchscreen, a presence-sensitive display, a sound card, a speaker, a lighting device, a projector, or any other device capable of generating output that may be intelligible to the user.

The charging device 175 may include a power adapter device and be configured to charge at least one of the portable case 115 and the UAV 110, when the portable case 115 and the UAV 110 are directly or indirectly connected to the vehicle 130. The charging may be wired or wireless.

The UAV 110 and the portable case 115 may be configured to communicate with each other and the vehicle 130 via one or more communications networks 180, and the vehicle 130 may be able to communicate with the UAV 110 and the portable case 115 via one or more communications networks 180, which may be wirelessly or wired. Any of the communications networks 180 and/or 185 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 180 and/or 185 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 180 and/or 185 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3A:
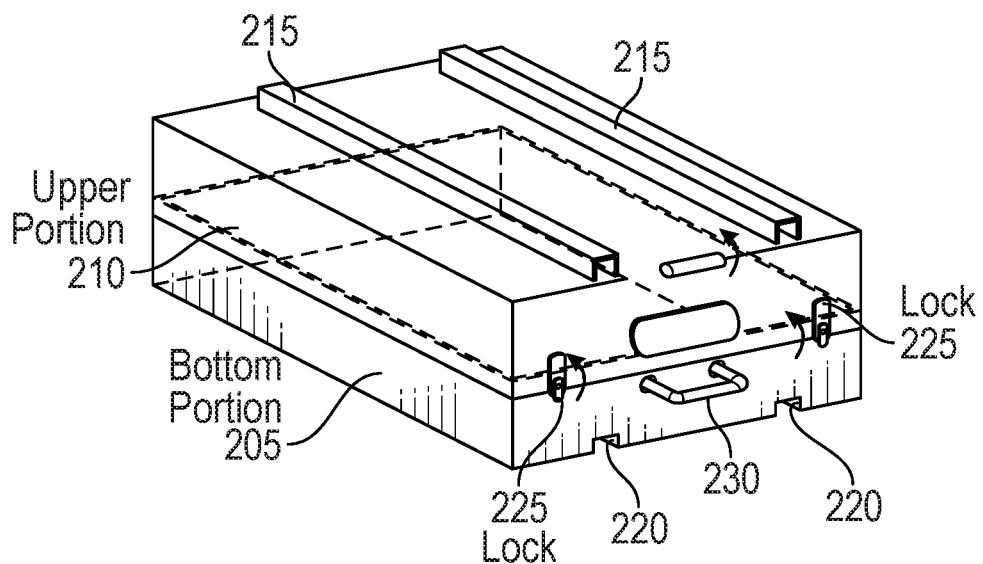
FIG. 3A is a schematic illustration of the portable case in a closed position in accordance with one or more embodiments of the disclosure.
Figure 3B:
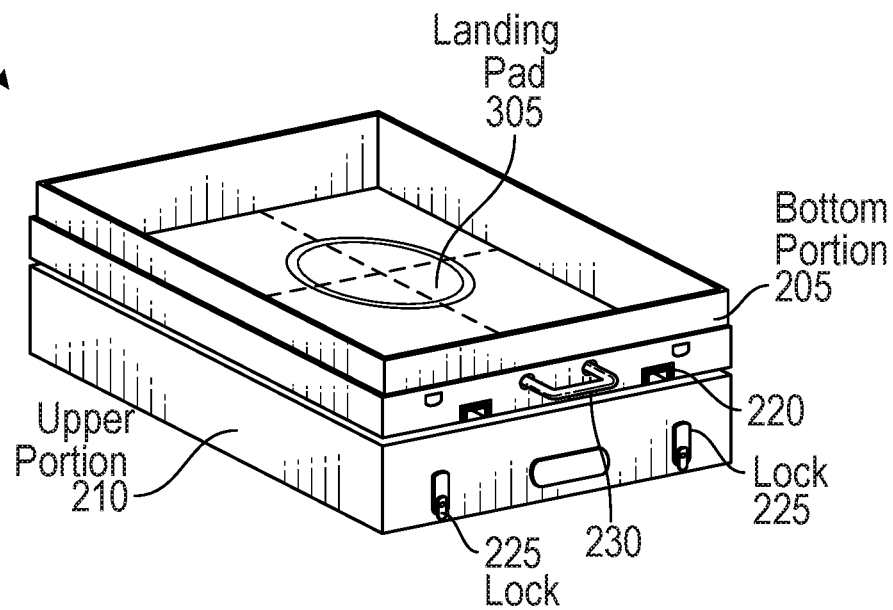
FIG. 3B is a schematic illustration of the portable case in a transformed position in accordance with one or more embodiments of the disclosure.
Figure 3C:
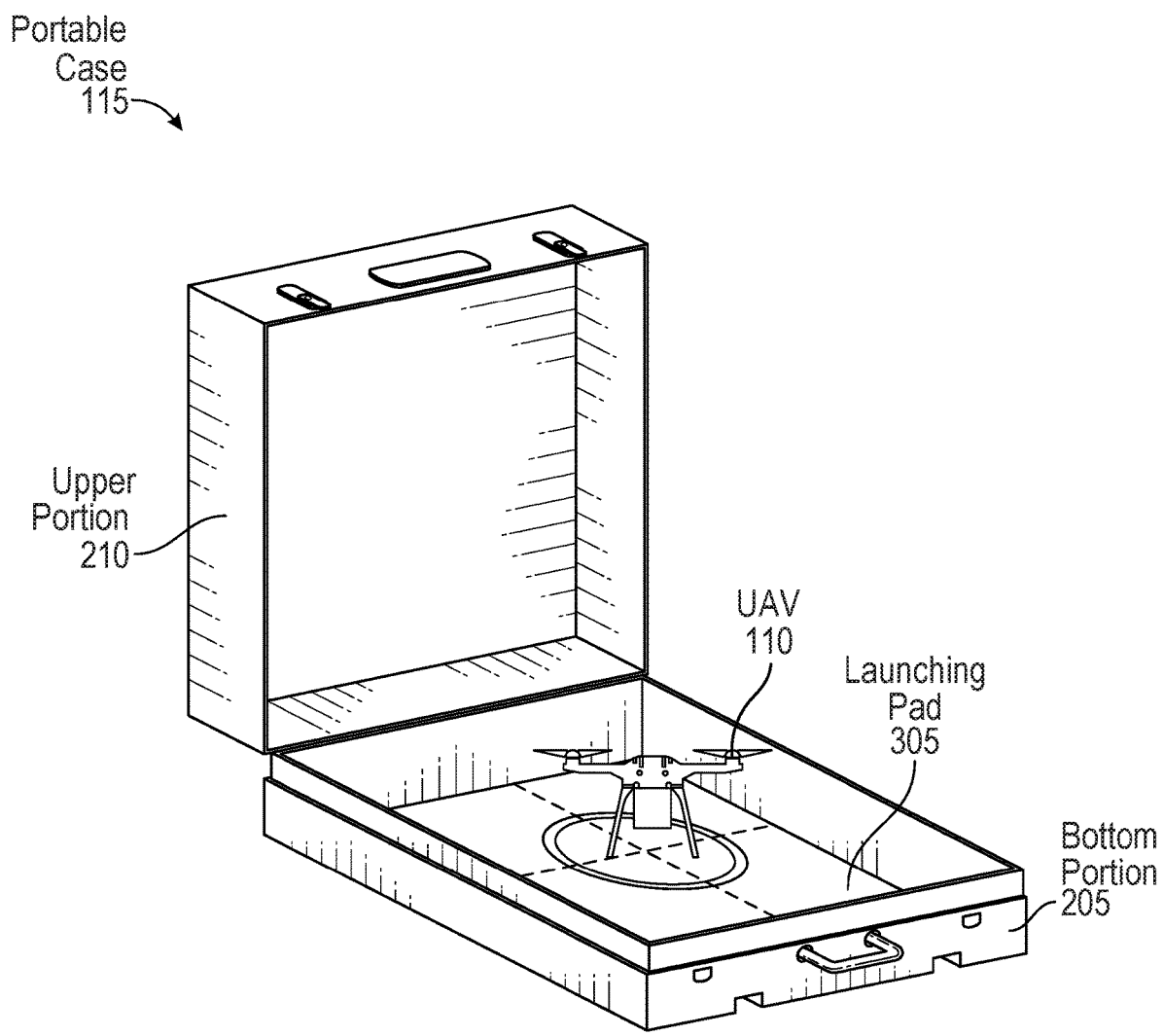
FIG. 3C is a schematic illustration of the portable case in an open position in accordance with one or more embodiments of the disclosure.

FIG. 3A is a schematic illustration of the portable case 115 in a closed position in accordance with one or more embodiments of the disclosure. FIG. 3B is a schematic illustration of the portable case 115 in a transformed position in accordance with one or more embodiments of the disclosure. FIG. 3C is a schematic illustration of the portable case 115 in an open position in accordance with one or more embodiments of the disclosure.

In FIG. 3A and FIG. 3B, the portable case 115 may include a bottom portion 205 and a removable upper portion 210, which can be mechanically connected to each other. In one example embodiment, each of the bottom portion 205 and the upper portion 210 is of an open container design. For example, each of the bottom portion 205 and the upper portion 210 can be implemented as a rectangular or square-like open container. When the bottom portion 205 and the upper portion 210 are directly connected to each other in the closed position, as shown in FIG. 3A, the bottom portion 205 and the upper portion 210 may form an internal space for storing the UAV(s) 110. According to various embodiments, the bottom portion 205 can be generally coupled to the upper portion 210 as one or more of the following: by sliding exterior attachment devices 220 of the bottom portion 205 onto sliding guides 215 of the upper portion 210, by sliding recesses (not shown) of the upper portion 210 onto sliding guides (not shown) of the bottom portion 205, by rotating the upper portion 210 about with a hinge, and by a magnetic force.

As shown in FIG. 3B and FIG. 3C, the bottom portion 205 may include a landing pad 305 for the UAV(s) 110. Specifically, the landing pad 305 can be enclosed between the removable upper portion 210 and the bottom portion 205 when the upper portion 210 is coupled to the bottom portion 205. The landing pad 305 may include graphical components for assisting the landing of the UAV(s) 110 onto a surface of the landing pad 305. The bottom portion 205 of the landing pad 305 may include one or more fasteners configured to fasten or secure the UAV(s) 110 in place. The landing pad 305 may be positioned within an least a portion of the bottom portion 210.

The bottom portion 205 of the landing pad 305 can also include one or more electrical ports (e.g., power source 150 of FIG. 2) for charging the UAV 110 and data transfer (e.g., communication interface 145) between the UAV 110 and the portable case 115 or the vehicle 130. Moreover, the bottom portion 205 or the upper portion 210 can, optionally, include one or more locks 225 designed to securely fasten or lock the bottom portion 205 and the upper portion 210 into the closed position, thereby improving the portability of the portable case 115. The lock(s) 225 can include a mechanical or electromechanical device configured to be locked or unlocked with a key or an electronic signal. In additional embodiments, the bottom portion 205 or the upper portion 210 can, optionally, include one or more handles 230 for supporting a user's handling of the portable case 115.

The bottom portion 205 also may configured to be mechanically connected to at least one of the exterior attachments (e.g., a vehicle roof railing) and the vehicle 130 directly or indirectly. To this end, a bottom exterior surface of the bottom portion 205 can include one, two, or more exterior attachment devices 220 (e.g., recesses, slider guides, or the like) to receive respective sliders or railings (e.g., roof rack railings) of the vehicle 130. The connection of the bottom portion 205 to the vehicle 130 is discussed in more detail below.

The upper portion 210 can be, in some embodiments, removable from the bottom portion 205. In some embodiments, the upper portion 210 can be pivotally or slidably connected to the bottom portion 205. In this case, the upper portion 210 can be pivotally opened such that the portable case 115 is in its open position as shown in FIG. 3C. In this scenario, the landing pad 305 may be exposed, allowing the UAV 110 to be deployed from the portable case 115 when the portable case 115 is coupled to a vehicle 130 or is operating remotely.

The upper portion 210 can be also configured to be connected to the bottom portion 205 when the bottom portion 205 is disconnected from the vehicle 130. As shown in FIG. 3B, which illustrates a transformed position of the portable case 115, the upper portion 210 can be mechanically connected to the bottom surface of the bottom portion 205 when the bottom portion 205 is decoupled from the vehicle 130. In this case, the upper portion 210 may serve as a base or a pedestal for the bottom portion 205. Because the upper portion 210 may include one, two, or more sliding guides 215 (e.g., connection devices) on its upper exterior surface, as shown in FIG. 3A, the upper portion 210 can be engaged with the bottom portion 205 by sliding the sliding guides 215 into the exterior attachment devices 220 of the bottom portion 205 as illustrated in FIG. 3B. As such, the position and shape of the sliding guides 215 can mirror the position and shape of the exterior attachment devices 220, or vice versa. In other embodiments, the bottom surface of the bottom portion 205 can include the sliding guides 215, while the upper portion 210 would include respective exterior attachment devices 220. It should be noted that in the transformed position of the portable case 115, the landing pad 305 can be exposed and cause the UAV 110 to be deployed.

Figure 4A:
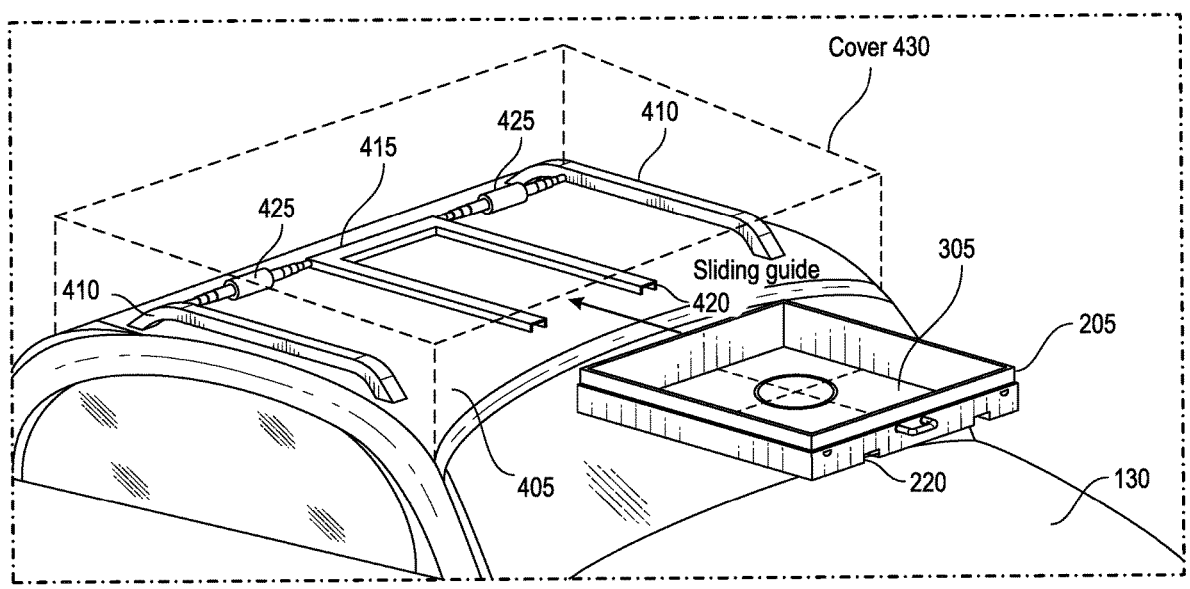
FIG. 4A is a schematic illustration of an exterior of the vehicle, including an adapter, and a bottom portion of a portable case decoupled from the vehicle in accordance with one or more embodiments of the disclosure.

FIG. 4A is a schematic illustration of an exterior of the vehicle 130, and the bottom portion 205 of the portable case 115 decoupled from the vehicle 130 in accordance with one or more embodiments of the disclosure. Specifically, FIG. 4A illustrates a vehicle roof 405 of the vehicle 130 having one or more exterior attachments. Some example exterior attachments include an exterior railing 410 which may be or include a slider bar, a groove, and a magnet (e.g., if the exterior attachment devices 220 of the bottom portion 205 are magnetized). The adapter 120 of FIG. 2 may include an adjustor 425 which can be mechanically and directly connected to one or more exterior attachment(s) such as the railings 410.

The adapter 120 can include a frame 415 and one or more adjustors 425 for connecting the frame 415 to the at least one exterior attachment of the vehicle 130. In FIG. 4A, the adjustors 425 may be configured to adjustably (e.g., slidably) connect the frame 415 to the railings 410. The adjustors 425 can include extenders, pushers, distance bars, bails, lateral struts, crossbars, stretchers, rods, and other similar components.

Figure 4B:
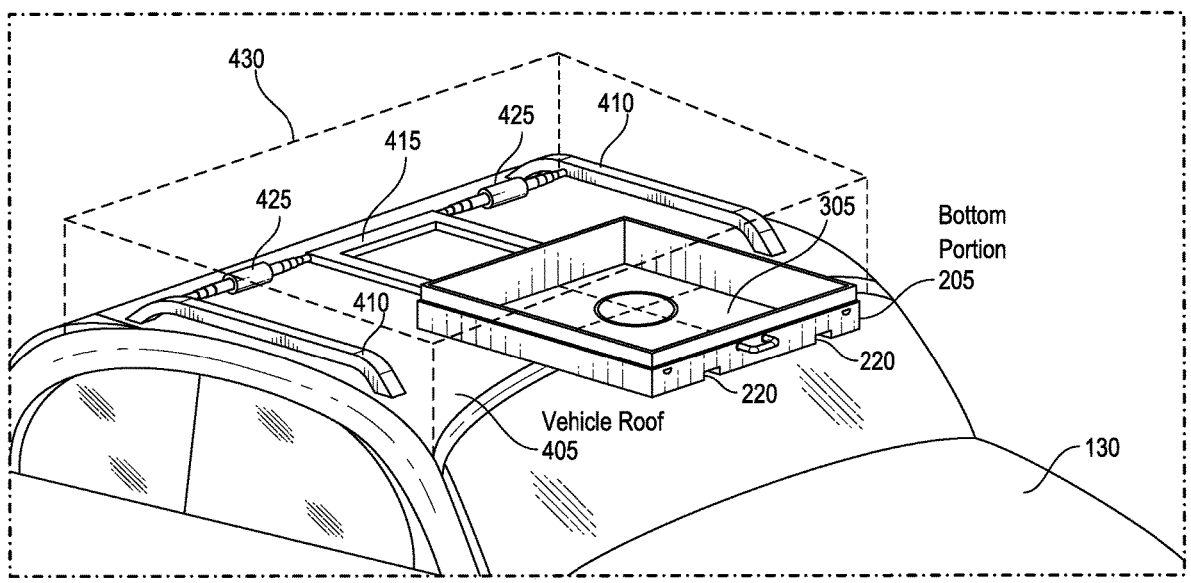
FIG. 4B is a schematic illustration of an exterior of a vehicle, including an adapter, and a bottom portion of the portable case partially coupled to the adapter in accordance with one or more embodiments of the disclosure.

The frame 415 can include one, two, or more sliding guides 420 for engagement with one or more respective exterior attachment devices 220 of the bottom portion 205 of the portable case 115. Specifically, the sliding guides 420 of the frame 415 can be inserted into or be received by the exterior attachment devices 220 of the bottom portion 205 of the portable case 115. FIG. 4B is a schematic illustration of the exterior of the vehicle 130, including the adapter 120 and the bottom portion 205 of the portable case 115 partially coupled to the adapter 120, in accordance with one or more embodiments of the disclosure. The sliding guides 420 may be magnetized with a polarity opposite of a polarity of the exterior attachment devices 220 to create a magnetic connection when the portable case 115 is coupled to the sliding guides 420.

As further shown in FIG. 4A or FIG. 4B, in some example embodiments there can be provided a movable cover 430. The cover 430 can be operatively and mechanically connected to the vehicle 130, the frame 415, the bottom portion 205, and/or the adapter 120. The cover 430 can be configured to open or close, and may be removable from the vehicle 130. In its close position, the cover 430 can cover any portion or all of the adapter 120 (including the railings 410, the frame 415, and the adjustors 425) and the portable case 115. In its open position, the cover 430 can expose the adapter 120 (including the railings 410, the frame 415, and the adjustors 425), and the portable case 115.

Figure 4C:
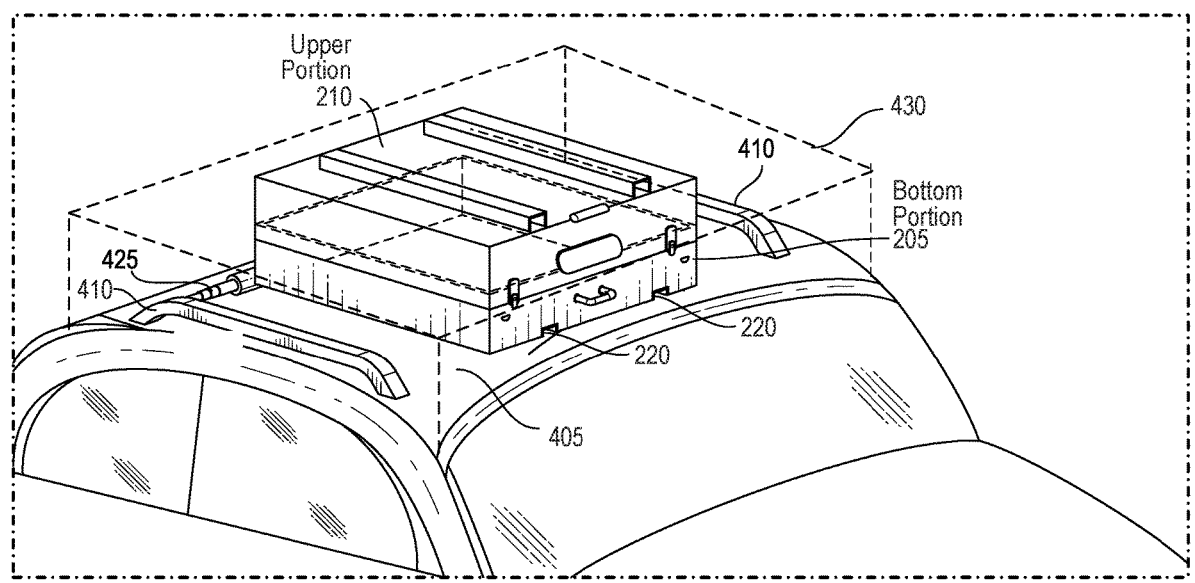
FIG. 4C is a schematic illustration of the exterior of a vehicle, including an adapter and a portable case in its closed position in accordance with one or more embodiments of the disclosure.

FIG. 4C is a schematic illustration of the exterior of the vehicle 130, including the adapter 120, and the portable case 115 in its closed position in accordance with one or more embodiments of the disclosure. As such, when the bottom portion 205 is fully engaged with the adapter 120 via the sliding guides 420 and corresponding exterior attachment devices 220, the upper portion 210 can be mechanically connected to the bottom portion 205 to enclose the UAV(s) 110 in the internal space of the portable case 115. FIG. 4C also illustrates that the portable case 115 can be indirectly connected to the vehicle 130 via the adapter 120.

Figure 4D:
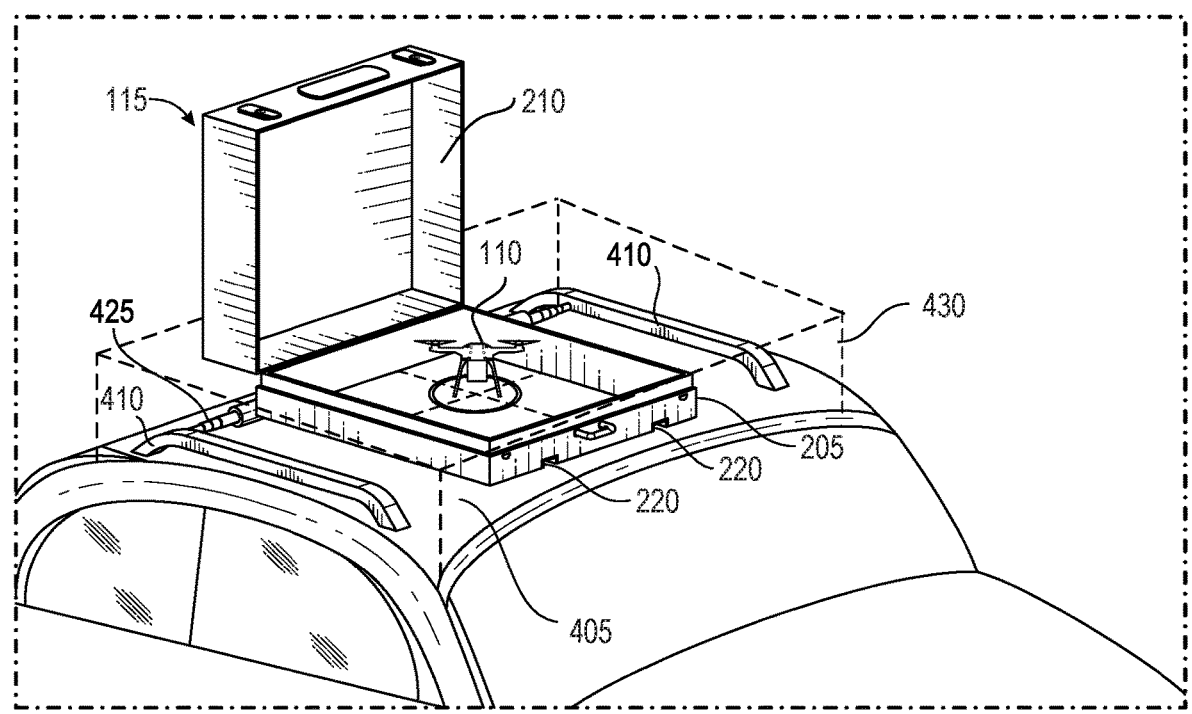
FIG. 4D is a schematic illustration of the exterior of a vehicle, including an adapter, and a portable case in its open position in accordance with one or more embodiments of the disclosure.

FIG. 4D is a schematic illustration of the exterior of the vehicle 130, including the adapter 120, and the portable case 115 in its open position in accordance with one or more embodiments of the disclosure. Specifically, the upper portion 210 of the portable case 115 can be pivotally rotated (opened) so as to expose the landing pad 305 and the UAV(s) 110. When the UAV(s) 110 is exposed, the UAV(s) 110 can be deployed. To this end, the in-vehicle computer can be used to control the deployment of the UAV(s) 110.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of components or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, components or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational components or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, components, and/or steps. Thus, such conditional language is not generally intended to imply that features, components, and/or steps are in any way required for one or more embodiments or that one or more embodiments necessarily include logic for deciding, with or without user input or prompting, whether these features, components, and/or steps are included or are to be performed in any particular embodiment.

Example embodiments of the disclosure may include one or more of the following examples:

Example 1 may include a portable case for an UAV, the portable case comprising: a landing pad for the UAV; a bottom portion comprising the landing pad, the bottom portion being configured to be removably coupled to a vehicle via at least one exterior attachment of the vehicle; and a removable upper portion configured to be mechanically coupled to the bottom portion when the bottom portion is decoupled from the vehicle.

Example 2 may include the portable case of example 1, wherein the portable case is covered by a movable cover when the bottom portion is coupled to the vehicle, the movable cover being integrated into a roof of the vehicle when deployed to cover the portable case.

Example 3 may include the portable case of example 1, wherein the bottom portion is further configured to couple to the at least one exterior attachment through an adapter.

Example 4 may include the portable case of example 1, wherein the at least one exterior attachment of the vehicle includes one or more of the following: an exterior railing, a slider bar, a groove, and a magnet.

Example 5 may include the portable case of example 1, wherein the bottom portion is coupled to the removable upper portion by one or more of the following: by sliding recesses of the bottom portion onto sliding guides of the removable upper portion, by sliding recesses of the removable upper portion onto sliding guides of the bottom portion, by rotating the upper portion using a hinge, and by a magnetic force.

Example 6 may include the portable case of example 1, wherein the landing pad of the bottom portion is enclosed between the removable upper portion and the bottom portion when the removable upper portion is coupled to the bottom portion.

Example 7 may include the portable case of example 1, wherein the landing pad of the bottom portion is exposed when the bottom portion is connected to the exterior attachment of the vehicle.

Example 8 may include the portable case of example 1, further comprising a power source configured to charge the UAV.

Example 9 may include the portable case of example 1 further comprising: at least one memory comprising computer-executable instructions; and one or more computer processors configured to access the at least one memory and execute the computer-executable instructions to: receive a first input signal from a device associated with the vehicle; and cause deployment of the UAV.

Example 10 may include a system comprising: at least one exterior attachment disposed on an exterior of a vehicle; an adapter configured to couple a portable case for an UAV to the at least one exterior attachment; and a moveable cover connected to the vehicle and configured to cover the portable case when the portable case is coupled to the vehicle, wherein the portable case comprises: a landing pad for the UAV; a bottom portion comprising the landing pad, wherein the bottom portion is configured to connect to the at least one exterior attachment via the adapter, and a removable upper portion configured to be connected to the bottom portion when the bottom portion is disconnected from the at least one exterior attachment, wherein the landing pad and the UAV are disposed between the removable upper portion and the bottom portion when the removable upper portion is connected to the bottom portion, and wherein the landing pad is exposed when the bottom portion is connected to the at least one exterior attachment.

Example 11 may include the portable case of example 10, wherein the movable cover is a part of a roof of the vehicle.

Example 12 may include the portable case of example 10, wherein the movable cover is operatively connected to the bottom portion.

Example 13 may include the portable case of example 10, wherein the adapter comprises a frame and one or more adjustors for connecting the frame to the at least one exterior attachment of the vehicle.

Example 14 may include the portable case of example 13, wherein the one or more adjustors are directly coupled to at least one of the at least one exterior attachment.

Example 15 may include the portable case of example 13, wherein the frame comprises two or more slides configured to engage with two or more prolonged recesses of the bottom portion.

Example 16 may include the portable case of example 10, wherein the portable case and the vehicle are configured to communicate wirelessly.

Example 17 may include the portable case of example 10, wherein the portable case further comprises a power source configured to be recharge by the vehicle when the bottom portion is connected to the vehicle.

Example 18 may include the portable case of example 10, wherein the portable case further comprises: at least one memory comprising computer-executable instructions; and one or more computer processors configured to access the at least one memory and execute the computer-executable instructions to: receive a first input signal from a device associated with the vehicle; and cause deployment of the UAV.

Example 19 may include a portable apparatus for an UAV, the portable apparatus comprising: means for deploying and landing the UAV; means for connecting a bottom portion of the apparatus to at least one exterior attachment of a vehicle, the bottom portion comprising the landing pad; and a removable means for covering the bottom portion when the bottom portion is disconnected from the at least one exterior attachment, wherein the landing pad and the UAV are disposed between the removable means and the bottom portion when the removable means is connected to the bottom portion, and wherein the landing pad is exposed when the bottom portion is connected to the at least one exterior attachment.

Example 20 may include the portable case of example 19, wherein the bottom portion is configured to operatively connect to a movable means for covering the apparatus, the bottom portion being connected to the at least one exterior attachment.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A portable case for an unmanned aerial vehicle (UAV), the portable case comprising a first portion and a second portion, wherein:
   the first portion is configured to be mechanically coupled to the second portion,
   the first portion comprises a landing pad for the UAV and at least one exterior attachment device configured to couple the first portion to a vehicle,
   the second portion is configured to decouple from the first portion,
   the second portion comprises at least one device configured to couple to the at least one exterior attachment device, and
   the portable case is covered by a movable cover when the first portion of the portable case is coupled to the vehicle, the movable cover being integrated into a roof of the vehicle.

2. The portable case of claim 1, wherein the at least one exterior attachment device is configured to couple the first portion to a vehicle through an adapter.

3. The portable case of claim 1, wherein the at least one exterior attachment device is configured to couple the first portion to a vehicle using one or more of the following: an exterior railing, a slider bar, a groove, and a magnet.

4. The portable case of claim 1, wherein the first portion is coupled to the second portion by one or more of the following: by sliding the at least one exterior attachment device of the first portion onto sliding guides of the second portion, by sliding recesses of the second portion onto the at least one exterior attachment device of the first portion, by rotating the second portion using a hinge, and by a magnetic force.

5. The portable case of claim 1, wherein the landing pad of the first portion is enclosed between the second portion and the first portion when the second portion is coupled to the first portion.

6. The portable case of claim 1, wherein the landing pad of the first portion is exposed when the second portion is decoupled from the first portion.

7. The portable case of claim 1, further comprising a power source configured to charge the UAV.

8. The portable case of claim 1, further comprising:
   at least one memory comprising computer-executable instructions; and
   one or more computer processors configured to access the at least one memory and execute the computer-executable instructions to:
   receive a first input signal from a device associated with the vehicle; and
   cause deployment of the UAV.

9. A system comprising:
   a first exterior attachment device disposed on a vehicle;
   an adapter configured to couple a portable case for an unmanned aerial vehicle (UAV) to the first exterior attachment device; and
   a moveable cover connected to the vehicle and configured to cover the portable case when the portable case is coupled to the first exterior attachment device,
   wherein the portable case comprises a first portion and a second portion, and wherein:
   the first portion is configured to be mechanically coupled to the second portion,
   the first portion comprises a landing pad for the UAV and a second exterior attachment device configured to couple the first portion to the first exterior attachment device,
   the second portion is configured to decouple from the first portion,
   the second portion comprises at least one device configured to couple to the second exterior attachment device, and
   the portable case is covered by a movable cover when the first portion of the portable case is coupled to the vehicle, the movable cover being integrated into a roof of the vehicle.

10. The system of claim 9, wherein the movable cover is operatively connected to the first exterior attachment device.

11. The system of claim 9, wherein the adapter comprises a frame and one or more adjustors for connecting the frame to the first exterior attachment device.

12. The system of claim 11, wherein the one or more adjustors are directly coupled to first exterior attachment device.

13. The system of claim 11, wherein the frame comprises a slide configured to engage with the second exterior attachment device.

14. The system of claim 9, wherein the portable case and the vehicle are configured to communicate wirelessly.

15. The system of claim 9, wherein the portable case further comprises a power source configured to be recharged by the vehicle when the first portion is coupled to the first exterior attachment device.

16. The system of claim 9, wherein the portable case further comprises:
- at least one memory comprising computer-executable instructions; and
- one or more computer processors configured to access the at least one memory and execute the computer-executable instructions to:
  - receive a first input signal from a device associated with the vehicle; and
  - cause deployment of the UAV.

17. A portable apparatus for an unmanned aerial vehicle (UAV), the portable apparatus comprising:
- means for connecting a first portion of the portable apparatus to at least one exterior attachment means of a vehicle, the first portion comprising a landing pad for the UAV; and
- means for connecting a second portion of the portable apparatus to the first portion of the portable apparatus, wherein the second portion is configured to be decoupled from the first portion,
- wherein the portable apparatus is covered by a movable cover when the first portion of the portable apparatus is coupled to the vehicle, the movable cover being integrated into a roof of the vehicle.

* * * * *